United States Patent
Cifuentes et al.

(10) Patent No.: US 9,732,191 B2
(45) Date of Patent: Aug. 15, 2017

(54) METHOD FOR CAPPING MQ-TYPE SILICONE RESINS

(71) Applicant: Dow Corning Corporation, Midland, MI (US)

(72) Inventors: Martin Cifuentes, Midland, MI (US); Douglas Lothamer, Midland, MI (US); Robert Fosdick, Midland, MI (US); Steven Evans, Freeland, MI (US); Susan Jeske, Clio, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 15/109,823

(22) PCT Filed: Jan. 8, 2015

(86) PCT No.: PCT/US2015/010556
§ 371 (c)(1),
(2) Date: Jul. 6, 2016

(87) PCT Pub. No.: WO2015/105931
PCT Pub. Date: Jul. 16, 2015

(65) Prior Publication Data
US 2016/0326320 A1    Nov. 10, 2016

Related U.S. Application Data

(60) Provisional application No. 61/924,798, filed on Jan. 8, 2014.

(51) Int. Cl.
*C08G 77/38* (2006.01)
(52) U.S. Cl.
CPC ................... *C08G 77/38* (2013.01)
(58) Field of Classification Search
CPC ..................................................... C08G 77/38
See application file for complete search history.

(56) References Cited

U.S. PATENT DOCUMENTS

| | | | |
|---|---|---|---|
| 2,676,182 A | 4/1954 | Herbert et al. |
| 2,814,601 A | 11/1957 | Currie et al. |
| 2,857,356 A | 10/1958 | Goodwin |
| 5,063,254 A | 11/1991 | Nakox |
| 5,075,103 A | 12/1991 | Halloran et al. |
| 5,085,859 A | 2/1992 | Halloran et al. |
| 5,110,890 A | 5/1992 | Butler |
| 5,330,747 A | 7/1994 | Krzysik |
| 5,733,537 A | 3/1998 | Halloran et al. |
| 5,786,413 A | 7/1998 | Weidner et al. |
| 5,800,816 A | 9/1998 | Brieva et al. |
| 5,837,223 A | 11/1998 | Barone et al. |
| 5,837,784 A | 11/1998 | Vincent |
| 6,036,947 A | 3/2000 | Barone et al. |
| 6,071,503 A | 6/2000 | Dreschsler et al. |
| 6,074,654 A | 6/2000 | Drechsler et al. |
| 6,139,823 A | 10/2000 | Drechsler et al. |
| 6,340,466 B1 | 1/2002 | Drechsler et al. |
| 6,395,825 B1 | 5/2002 | Becker et al. |
| 6,406,683 B1 | 6/2002 | Drechsler et al. |
| 6,552,160 B2 | 4/2003 | Pavlin et al. |
| 6,818,722 B2 | 11/2004 | Mutoh et al. |
| 6,825,264 B2 | 11/2004 | Oda et al. |
| 6,875,245 B2 | 4/2005 | Pavlin et al. |
| 6,991,782 B2 | 1/2006 | Kanji et al. |
| 7,368,519 B2 | 5/2008 | Chu et al. |
| 7,803,358 B2 | 9/2010 | Gordon et al. |
| 7,951,895 B2 | 5/2011 | Ramdani et al. |
| 8,017,712 B2 | 9/2011 | Berry et al. |
| 8,080,257 B2 | 12/2011 | Kanji et al. |
| 8,092,910 B2 | 1/2012 | Bailey et al. |
| 8,124,710 B2 | 2/2012 | Cook et al. |
| 8,367,083 B2 | 2/2013 | Barba et al. |
| 8,604,151 B2 | 12/2013 | Li et al. |
| 2002/0058054 A1 | 5/2002 | Arnaud |
| 2003/0039620 A1 | 2/2003 | Rodriguez et al. |
| 2004/0180011 A1 | 9/2004 | Schlosser |
| 2008/0318059 A1* | 12/2008 | Sherman .............. C08G 77/455 428/423.1 |

(Continued)

FOREIGN PATENT DOCUMENTS

| | | |
|---|---|---|
| EP | 1113036 A3 | 7/2001 |
| GB | 2319527 B | 5/2001 |
| JP | 0459284 B2 | 9/1992 |
| JP | 199472085 B2 | 9/1994 |
| JP | 07330536 A | 12/1995 |
| JP | 2992564 B2 | 10/1999 |
| WO | 9717058 A1 | 5/1997 |
| WO | 9717059 A1 | 5/1997 |

OTHER PUBLICATIONS

Fang, et. al., "Synthesis and Characterization of MQ Silicon Resins", Journal of Applied Polymer Science, 2012, pp. 3532-3526, vol. 125, Wiley Periodicals, Inc.

*Primary Examiner* — Kuo-Liang Peng

(74) *Attorney, Agent, or Firm* — Timothy J. Troy

(57) ABSTRACT

An intermediate reaction product to speed the reaction for producing capped MQ resins is disclosed. The intermediate reaction product includes an MQ-type silicone resin; a halosilane capping agent; and a polar organic compound. Optionally, a condensation catalyst and a solvent may be added to prepare the intermediate reaction product. Also, a method for preparing a reaction product to speed the reaction for producing capped MQ resins is disclosed. The method comprises the steps of combining ingredients comprising: an MQ-type silicone resin; a halosilane capping agent; and a polar organic compound. Optionally, a condensation catalyst and a solvent may be added to prepare the reaction product.

13 Claims, No Drawings

(56) References Cited

U.S. PATENT DOCUMENTS

| | | |
|---|---|---|
| 2010/0026070 A1 | 2/2010 | Rohee et al. |
| 2010/0260700 A1 | 10/2010 | Dop |
| 2010/0310489 A1 | 12/2010 | Barba et al. |
| 2010/0310490 A1 | 12/2010 | Barba et al. |
| 2013/0150535 A1* | 6/2013 | Griswold ............... C09J 183/04 525/477 |
| 2014/0018467 A1 | 1/2014 | Durand et al. |

* cited by examiner

000
METHOD FOR CAPPING MQ-TYPE SILICONE RESINS

CROSS REFERENCE TO RELATED APPLICATIONS

This application is a U.S. national stage filing under 35 U.S.C. §371 of PCT Application No. PCT/US15/010556 filed on 8 Jan. 2015, currently pending, which claims the benefit of U.S. Patent Application No. 61/924798 filed 8 Jan. 2014 under 35 U.S.C. §119(a)-(d) and 35 U.S.C. §365(a). PCT Application No. PCT/US15/010556 and Patent Application No. 61/924798 are hereby incorporated by reference.

BACKGROUND

Polyorganosiloxanes are molecules made up of combinations of M, D, T, and/or Q units. M units have formula $R'_3SiO_{1/2}$, D units have formula $R'_2SiO_{2/2}$, T units have formula $R'SiO_{3/2}$, and Q units have formula $SiO_{4/2}$, where each R' is monovalent and may be independently selected from organic and inorganic moieties. Generally, silicone resins are polyorganosiloxanes in which at least 30 mol % of the units in the molecule are T and/or Q units. MQ-type silicone resins (MQ resins) are polyorganosiloxane resins made up primarily of M and Q units. When MQ resins are produced, they typically contain 1% to 20% of groups of formula (RO), where R is a hydrogen atom or an alkyl group of 1 to 4 carbon atoms.

Capping is a process used to reduce the (RO) group content of the MQ resins, particularly when at least some of the R moieties are hydrogen atoms. Capped MQ resins, which have alkenyl groups bonded to silicon atoms in the M units, such as vinyl-functional MQ resins, are useful in compositions that can be cured by hydrosilylation and/or radical cure mechanisms. Such MQ resins find use in many industries and applications, such as additives for automotive airbag coating compositions. Current processes for capping MQ resins to reduce (RO) group content are time consuming and inefficient. There is an industry need to speed the reaction for producing such capped MQ resins.

BRIEF SUMMARY OF THE INVENTION

An intermediate reaction product to speed the reaction for producing capped MQ resins is disclosed. The intermediate reaction product includes an MQ-type silicone resin; a halosilane capping agent; and a polar organic compound. Optionally, a condensation catalyst and a solvent may be added to prepare the intermediate reaction product. Also, a method for preparing a reaction product to speed the reaction for producing capped MQ resins is disclosed. The method comprises the steps of combining ingredients comprising: an MQ-type silicone resin; a halosilane capping agent; and a polar organic compound. Optionally, a condensation catalyst and a solvent may be added to prepare the reaction product.

DETAILED DESCRIPTION OF THE INVENTION

A method for preparing a reaction product comprising a capped MQ-type silicone resin is disclosed. The method includes the steps of combining ingredients to form a mixture. The formulation includes an MQ-type silicone resin having an exemplary formula $R^1_n(RO)_bSiO_{((4-n-b)/2)}$, where each $R^1$ is monovalent and selected from hydrogen, hydrocarbyl, oximo, epoxide, carboxyl, ether, polyether, amide, and alkyl amino groups. The $R^1$ moieties may be the same or different with the proviso that at least sixty mole percent of the $R^1$ groups are hydrocarbyl, subscript n is 1.1 to 1.6, subscript b has a value such that group (RO) is 1% to 20% of the MQ-type silicone resin, and each R is hydrogen or an alkyl group of 1 to 4 carbon atoms. The formulation also includes a halosilane capping agent having and exemplary formula $R^2_xSiR^3_{(4-x)}$, wherein $R^2$ is a monovalent hydrocarbyl group, each $R^3$ is a halogen atom, and subscript x is in the range of 1 to 3. The formulation also includes a polar organic compound. Optionally, a condensation catalyst and a solvent may be added to the formulation.

Combining the ingredients may be performed by any convenient means, such as mixing. The order of addition of the ingredients is not critical. However, in one exemplary embodiment, this combination step is performed by the following order of addition: (1) mixing an MQ-type silicone resin with a solvent to form a mixture; (2) adding a polar organic compound to the mixture; (3) adding a halosilane capping agent to the mixture; and (4) adding an acid catalyst.

Combining the ingredients may be performed under ambient conditions (e.g., without external heating), however, the method may further comprise heating the mixture. Heating the mixture may increase the reaction conversion. The aforementioned steps may be performed separately and consecutively. Alternatively, these steps may be performed concurrently. The combining ingredients step, as well as the heating step, when utilized, is performed under conditions sufficient to react the $R^3$ substituted silicon atom of the capping agent with the group of formula (RO) in the MQ-type silicone resin, thereby linking the $R^2_xSi$— group with a silicon atom in the resin through a divalent oxygen atom and forming the capped MQ-type silicone resin. In one exemplary embodiment, these steps are performed at a temperature of 20° C. to 200° C. for 0.5 to 24 hours. Alternatively, when the heating step is present, heating may be performed at 50° C. to 180° C. for 1 to 16 hours, alternatively 75° C. to 150° C. for 2 to 12 hours. The necessary reaction conditions can vary depending on various factors including the (RO) content of the resin, reactivity of the capping agent, and whether an acid catalyst is present. In addition to the capped polyorganosiloxane resin, the resulting reaction product may comprise volatile by-products, such as water, and HCl or HBr (when the capping agent is a chlorosilane or bromosilane), and unreacted ingredients, such as unreacted solvent, polar organic compound, and/or capping agent.

The method may further comprise recovering the capped MQ-type silicone resin. Recovering the capped MQ-type silicone resin may be performed by any convenient technique, such as subjecting the reaction product produced in step 1 (or when present, step 2) to stripping or distillation under ambient or sub-atmospheric pressures. The recovering step removes unreacted ingredients and/or volatile by-products from the capped MQ-type silicone resin. The capped MQ-type silicone resin recovered may be either neat or in solution with a solvent. The solvent may be ingredient (E), described herein, that is left with the capped MQ-type silicone resin under the conditions selected for this third step. Alternatively, the capped MQ-type silicone resin may be recovered neat and then dissolved in fresh solvent (that may be the same or different as the solvent selected for ingredient (E) in the first step described above.

In one exemplary embodiment, the MQ-type silicone resin (Ingredient A) has a general formula (I): $R^1_n(RO)_b$ $SiO_{(4-n-b/2)}$. As mentioned previously, each $R^1$ is monovalent and selected from hydrogen, hydrocarbyl (such as alkyl, alkenyl, aryl, and aralkyl), oximo, epoxide, carboxyl, ether, polyether, amide, and alkyl amino groups, which $R^1$ moieties may be the same or different, with the proviso that at least sixty mole percent of said $R^1$ groups are hydrocarbyl. Examples of useful alkyl groups for $R^1$ include alkyl groups of 1 to 18 carbon atoms, alternatively alkyl groups of 1 to 8 carbon atoms, such as Me, Et, Pr, hexyl and octyl. Examples of useful alkenyl groups for $R^1$ include alkenyl groups of 2 to 18 carbon atoms, alternatively alkenyl groups of 2 to 8 carbon atoms, such as vinyl, propenyl, hexenyl, octenyl. Examples of useful aryl groups for $R^1$ include aryl groups of 6 to 18 carbon atoms, alternatively aryl groups of 6 to 8 carbon atoms, such as phenyl. Examples of useful aralkyl groups for $R^1$ include aralkyl groups aralkyl groups of 7 to 18 carbon atoms such as benzyl or 2-phenylethyl. Alternatively, each $R^1$ is selected from methyl, vinyl, hydrogen, and phenyl. Alternatively, each $R^1$ is methyl.

One MQ resin may be used in the method described herein, or a blend of two or more MQ resins such that, on average, the subscript n in the above general formula (I) is from 1.1 to 1.6. Alternatively, on average n is 1.1 to 1.5. Alternatively, on average n is 1.3 to 1.5. When utilizing a blend, the MQ resins differ in at least one property such as structure, viscosity, molecular weight, unit formula, and substituent moieties. The MQ resin may have a number average molecular weight ranging from 1,000 to 40,000 daltons, alternatively 10,000 to 25,000 daltons, alternatively 1,500 to 15,000 daltons, alternatively 3,000 to 7,500 daltons, and alternatively 3,500 to 6,500 daltons as measured by GPC. Alternatively, the number average molecular weight (Mn) of the MQ resin may be 1,500 to 7,000 daltons, alternatively 2,000 to 5,000 daltons.

MQ resins suitable for use in the first step, and methods for their preparation, are known generally in the art. For example, U.S. Pat. No. 2,814,601 to Currie et al., Nov. 26, 1957, which is hereby incorporated by reference, discloses that MQ resins can be prepared by converting a water-soluble silicate into a silicic acid monomer or silicic acid oligomer using an acid. Another method for preparing MQ resins is disclosed in U.S. Pat. No. 2,857,356 to Goodwin, Oct. 21, 1958, which is hereby incorporated by reference. Goodwin discloses a method for the preparation of an MQ resin by the cohydrolysis of a mixture of an alkyl silicate and a hydrolyzable trialkylsilane organopolysiloxane with water. Another method for preparing an MQ resin is disclosed in U.S. Pat. No. 8,017,712 to Berry et al., Sep. 13, 2011, which is hereby incorporated by reference.

Subscript b in the above general formula (I) varies such that the group (RO) is 1% to 20% of the MQ resin, alternatively 1% to 5% of the MQ resin. Each R is hydrogen or an alkyl group of 1 to 4 carbon atoms. Alternatively, each R is hydrogen or an alkyl group of 1 to 3 carbon atoms. Alternatively, each R is hydrogen.

MQ resins are known in the art and comprise $R^1_3SiO_{1/2}$ (M) units and $SiO_{4/2}$ (Q) units, where $R^1$ is as described above. The MQ resin may have a molar ratio of M to Q units of 0.5 to 1.5, M units per Q unit, (M/Q ratio), alternatively 0.6 to 1.2, and alternatively 0.7 to 0.9. The MQ resin may further comprise a small amount of a low molecular weight material comprising a neopentamer of the formula $(R^1_3SiO)_4Si$, which is a volatile siloxane impurity formed during preparation of the resin. The MQ resins suitable as ingredient (A) in the present method may also contain D and T units, providing that at least 80 mole %, alternatively 90 mole % of the total siloxane units are M and Q units.

The MQ resins used in the method described herein may be dispersed in a solvent. The MQ resins can be dispersed separately in the solvent, or generally they are produced using a solvent. Examples of useful solvents include aliphatic and aromatic hydrocarbons, such hexane, heptane, xylene, and toluene; and polyorganosiloxanes having a degree of polymerization (DP) of 10 or less, alternatively, a DP less than 10, alternatively, a DP less than 6. An example of a polyorganosiloxane solvent is 0.65 to 1.5 cSt trimethylsiloxy-terminated polydimethylsiloxane. Other suitable solvents are described below as ingredient (E).

Suitable resins for use in the method described herein are commercially available. Exemplary commercially available MQ resins include Dow Corning® MQ-1600 Solid Resin, which is a trimethylsiloxysilicate from Dow Corning Corporation of Midland, Mich., U.S.A.

The halosilane capping agent (Ingredient B) may have general formula (II): $R^2_xSiR^3_{(4-x)}$ where each $R^2$ is H, a siloxy group or a monovalent hydrocarbyl group, each $R^3$ is independently a halogen atom, and subscript x is 1 to 3. Thus, when x is 3, the capping agent is $R^2_3SiR^3$. Each $R^2$ is H, a siloxy group or a monovalent hydrocarbyl group such as an alkyl, alkenyl, aryl, or aralkyl group. Suitable alkyl groups for $R^2$ include alkyl of 1 to 8 carbon atoms, alternatively 1 to 4 carbon atoms, such as Me, Et, Pr, and Bu. Suitable alkenyl groups for $R^2$ include alkenyl groups of 2 to 8 carbon atoms, such as Vi and hexenyl. Suitable aryl groups for $R^2$ include Ph. $R^3$ is a halogen atom, such as Cl, Br, F, or I; alternatively Cl or Br; and alternatively Cl.

Examples of suitable halosilane capping agents include dimethylhydrogenchlorosilane, dimethylhexenylchlorosilane, dimethylvinylchlorosilane, trimethylchlorosilane, diphenylmethylchlorosilane, dimethylphenylchlorosilane, methylphenylvinylchlorosilane, dimethylvinylbromosilane, trimethylbromosilane, diphenylmethylbromosilane, dimethylphenylbromosilane, methylphenylvinylbromosilane and combinations thereof. Alternatively, the halosilane capping agent may be selected from the group consisting of dimethylhydrogenchlorosilane, dimethylhexenylchlorosilane, dimethylvinylchlorosilane, trimethylchlorosilane, dimethylphenylchlorosilane, methylphenylvinylchlorosilane, dimethylvinylbromosilane, trimethylbromosilane, dimethylphenylbromosilane, methylphenylvinylbromosilane, and combinations thereof. Alternatively, the halosilane capping agent may be selected from the group consisting of dimethylhydrogenchlorosilane, dimethylhexenylchlorosilane, dimethylvinylchlorosilane, trimethylchlorosilane, dimethylvinylbromosilane, trimethylbromosilane, and combinations thereof.

Alternatively, ingredient B may be an alkenyl-functional halosilane capping agent. The alkenyl-functional halosilane capping agent may have general formula (III): $R^5R^4_2SiR^3$, where each $R^3$ is as described above, each $R^4$ is H, a siloxy group or a monovalent hydrocarbyl group, and each $R^5$ is an alkenyl group. Each $R^4$ is H, a siloxy group or a monovalent hydrocarbyl group such as an alkyl, alkenyl, aryl, or aralkyl group. Suitable alkyl groups for $R^4$ include alkyl of 1 to 8 carbon atoms, alternatively 1 to 4 carbon atoms, such as Me, Et, Pr, and Bu. Suitable aryl groups for $R^4$ include Ph. Suitable alkenyl groups for $R^4$ and/or $R^5$ include alkenyl groups of 2 to 8 carbon atoms, such as Vi and hexenyl. Alternatively, each $R^4$ may be H, an alkyl group, or an aryl group. Examples of suitable alkenyl-functional halosilane capping agents include dimethylhexenylchlorosilane, dimethylvinylchlorosilane, methylphenylvinylchlorosilane, dimethylvinylbromosilane, methylphenylvinylbromosilane, and combinations thereof. Alternatively, the alkenyl-functional halosilane capping agent may be selected from the group consisting of dimethylhexenylchlorosilane, dimethylvinylchlorosilane, dimethylvinylbromosilane, and combinations thereof. Alternatively, the alkenyl-functional halosilane capping agent may be dimethylvinylchlorosilane.

The amount of capping agent added during the method described herein depends on various factors including the (RO) group content of the MQ resin selected for ingredient (A) and the capping agent selected. However, the amount of capping agent may be sufficient to provide 0.05 to 5 moles of capping agent per mole of (RO) groups in ingredient (A), alternatively 0.1 to 2 moles, and alternatively 0.2 to 1 mole. Alternatively, the amount of capping agent may be 0.01 to 0.50 parts by weight of capping agent per parts by weight of ingredient (A). Alternatively, the amount of capping agent may range from 0.05 to 0.3, alternatively 0.10 to 0.20, parts by weight of ingredient (B) per part by weight of ingredient (A).

The polar organic compound (Ingredient C) may be an alcohol, an ester, a ketone, an amide, an amine, a carboxylic acid, or a combination thereof. Suitable alcohols include methyl alcohol, ethyl alcohol, iso-propyl alcohol, tert-butyl alcohol, allyl alcohol, n-propyl alcohol, sec-butyl alcohol, tert-amyl alcohol, isobutyl alcohol, methylisopropylcarbinol, n-butyl alcohol, diethylcarbinol, sec-amyl alcohol, 1-chloro-2-propanol, sec-butylcarbinol, ethylene chlorohydrin, isoamyl alcohol, 4-methyl-2-pentanol, 2-chloro-1-propanol, 3-hexanol, methylisobutylcarbinol, n-amyl alcohol, cyclopentanol, 2-ethyl-1-butanol, 2-bromoethanol, di-n-propylcarbinol, n-hexyl alcohol, 2-heptanol, 2-methylcyclohexanol, furfuryl alcohol, 4-methylcyclohexanol, 3-methylcyclohexanol, cyclohexanol, trichloroethyl alcohol, lauryl alcohol, cinnamyl alcohol, α-terpineol, o-tolylcarbinol, myristyl alcohol, menthol, anisyl alcohol, p-tolylcarbinol, triphenylcarbinol, borneol, diisobutylcarbinol, n-heptyl alcohol, tetrahydrofurfuryl alcohol, 2-octanol, cyclohexylcarbinol, 2,3-dichloro-1-propanol, 2-ethyl-1-hexanol, n-octyl alcohol, methylphenylcarbinol, benzyl alcohol, n-nonyl alcohol, m-tolycarbinol, β-phenylethyl alcohol, ethylphenylcarbinol, n-decyl alcohol, γ-phenylpropyl alcohol, benzohydrol, and a combination thereof. Alternatively, the polar organic compound may be a monohydric alcohol of 1 to 6 carbon atoms. Alternatively, the monohydric alcohol may be methyl alcohol, ethyl alcohol, iso-propyl alcohol, n-propyl alcohol, tert-butyl alcohol, sec-butyl alcohol, iso-butyl alcohol, n-butyl alcohol, or a combination thereof.

Alternatively, the polar organic compound may be an as an ester, e.g. ethyl acetate, propyl acetate, butyl acetate, or a combination thereof. Alternatively, the polar organic compound may be a ketone, e.g. methylethyl ketone, methylisobutyl ketone, or a combination thereof.

Ingredient C is present in an amount sufficient to improve conversion of the reaction of the (RO) groups in the MQ resin and the $R^3$ moieties in the capping agent, as compared to the same method in which Ingredient C is omitted. In one exemplary embodiment, the amount of Ingredient C is sufficient to provide 0.005 to 5 moles of Ingredient C per mole of (RO) groups in Ingredient A. Alternatively, the amount of Ingredient C is sufficient to provide 0.005 to 0.5 moles of Ingredient C per mole of (RO) groups in Ingredient A. Alternatively, the amount of Ingredient C is sufficient to provide 0.01 to 0.2 moles of Ingredient C per mole of (RO) groups in Ingredient A. Alternatively, the amount of Ingredient C can be 0.1% to 1.5% based on the combined weights of ingredients A, B, C, D, and E.

Adding a condensation catalyst (Ingredient D), such as an acid catalyst, is optional because the component (e.g. the acid) that acts as a catalyst (e.g., HCl or HBr) may be generated in situ during capping. The acid catalyst may be HCl, HBr, trifluoroacetic acid, trifluoromethanesulfonic acid, carboxylic acid, or a strong acid ion exchange resin. Strong acid catalysts are commercially available, such as strong acid ion exchange resins marketed as Amberlyst 15. The amount of condensation catalyst depends on various factors including the type of capping agent selected as Ingredient B and the (RO) content of ingredient A. However, when present, the amount of Ingredient D may be 10 ppm to 10,000 ppm, based on the combined weights of ingredients A, B, C, D, and E. Alternatively, the amount of Ingredient D may be 50 ppm to 5,000 ppm, and alternatively 100 ppm to 2,500 ppm, on the same basis.

As mentioned above, Ingredient A may be dissolved in all or a portion of a solvent (Ingredient E) before Ingredient A is combined with any other ingredients. For example, Ingredient A may be prepared in a solvent. Examples of suitable organic solvents for Ingredient E include a hydrocarbon liquid exemplified by an aromatic hydrocarbon such as benzene, toluene, xylene, or a combination thereof; or an aliphatic hydrocarbon such as hexane, heptane, cyclohexane, or a combination thereof. Alternatively, the organic solvent may by a hydrocarbon mixture such as naphtha or mineral spirits. Alternatively, the organic solvent may be a halogenated hydrocarbon such as a chlorocarbon. Alternatively, Ingredient E may comprise a polyorganosiloxane solvent unreactive with Ingredient A. Useful polyorganosiloxane solvents are exemplified by, but not limited to, linear siloxanes such as hexamethyldisiloxane and cyclic siloxanes such as octamethylcyclotetrasiloxane, and decamethylcyclopentasiloxane. The amount of solvent selected depends on various factors including the viscosity of the ingredients when combined and the handling capabilities of the equipment selected for performing the method. However, when present, the amount of solvent may range from 5% to 90% based on the combined weights of Ingredients A and E.

A variety of reaction vessel types may be used to perform the method steps described herein. In one exemplary embodiment, the reaction vessel is a batch or semi-batch reactor, mixed using an agitator, stirring paddle, or other mixing technique. Alternatively, the contents of the reaction vessel may be mixed using a series of mixing loops and mixing chambers. The reaction vessel may also be equipped with an inert gas purge. The inert gas purge may comprise nitrogen, argon, or other inert gas that is nonreactive with the contents of the reaction vessel.

Alternatively, a continuous mixing apparatus can be used. The continuous mixing apparatus may be any apparatus capable of continuously mixing, heating, and optionally devolatilizing the ingredients as they pass through the apparatus. The continuous mixing apparatus is exemplified by a devolatilizing extruder. The devolatilizing extruder may be a single-screw or multiple-screw extruder, such as a twin-screw extruder.

EXAMPLES

The examples are intended to illustrate some exemplary embodiments of the invention and should not be interpreted as limiting the scope of the invention set forth in the claims. The comparative examples are non-invention examples.

"MQ-1" refers to a solution of a first batch of MQ resin (71%) and solvent (29%); the solvent being xylene. The MQ resin is a trimethylsilylated silica polymer having M units of formula ($Me_3SiO_{1/2}$) and Q units of formula ($SiO_{4/2}$) in a M/Q mole ratio of 0.75/1.0, a weight average molecular weight (Mw) of 21,295 daltons, and a silanol content of 2.85% based on the weight of the solution. "MQ-2" refers to a solution of a second batch of MQ resin (72%) and xylene (28%). The MQ resin is a trimethylsilylated silica polymer having M units of formula ($Me_3SiO_{1/2}$) and Q units of formula ($SiO_{4/2}$) in a M/Q mole ratio of 0.75/1.0, a Mw of 20,260 daltons, and silanol content of 2.9% based on the weight of the solution. "MQ-3" refers to a solution of a third batch of MQ resin (72%) and xylene (28%). The MQ resin is a trimethylsilylated silica polymer having M units of formula ($Me_3SiO_{1/2}$) and Q units of formula ($SiO_{4/2}$) in a M/Q mole ratio of 0.75/1, a Mw of 21,186 daltons, and silanol content of 3% based on the weight of the solution. "MQ-4" refers to a solution of a fourth batch of MQ resin (71%) and xylene (29%). The MQ resin is a trimethylsilylated silica polymer having M units of formula ($Me_3SiO_{1/2}$) and Q units of formula ($SiO_{4/2}$) in a M/Q mole ratio of 0.75/1, a Mw of 20,849 daltons, and silanol content of 2.8% based on the weight of the solution. "MQ-5" refers to a solution of a fifth batch of MQ resin (72%) and xylene (28%). The MQ resin is a trimethylsilylated silica polymer having M units of formula ($Me_3SiO_{1/2}$) and Q units of formula ($SiO_{4/2}$) in a M/Q mole ratio of 0.75/1, a Mw of 19,724 daltons, and silanol content of 2.8% based on the weight of the solution. "MQ-6" refers to a solution of a sixth batch of MQ resin (72%) and xylene (28%). The MQ resin is a trimethylsilylated silica polymer having M units of formula ($Me_3SiO_{1/2}$) and Q units of formula ($SiO_{4/2}$) in a M/Q mole ratio of 0.75/1, a Mw of 20,645 daltons, and silanol content of 2.9% based on the weight of the solution. "MQ-7" refers to a solution of a sixth batch of MQ resin (72%) and xylene (28%). The MQ resin is a trimethylsilylated silica polymer having M units of formula ($Me_3SiO_{1/2}$) and Q units of formula ($SiO_{4/2}$) in a M/Q mole ratio of 0.75/1, a Mw of 21,555 daltons, and silanol content of 2.8% based on the weight of the solution. "$Me_2ViSiCl$" is dimethylvinylchlorosilane. The reaction vessel used was a 3-necked flask equipped with a stirring rod, a condenser, and a temperature probe.

In Example 1, 2.44 g 2-propanol was added to 499 g of MQ-1 in the flask with stirring, followed closely by adding 50 g of $Me_2ViSiCl$. The resulting mixture was then reacted for 4 hours at 75° C. Unreacted $Me_2ViSiCl$ and volatile by-products were then stripped from the reaction mixture by heating at 140° C. and atmospheric pressure. A sample of the resulting capped MQ resin solution was then analyzed for vinyl content via FTIR to determine the extent of reaction. Vinyl concentration was determined to be 1.84% based on the capped MQ resin solids in the solution.

In Comparative Example 1, 50 g $Me_2ViSiCl$ was added to 497 g of MQ-1 in the flask with stirring. The resulting mixture was reacted for 4 hours at 75° C. Unreacted $Me_2ViSiCl$ and volatile by-products were then stripped from the reaction mixture by heating at 137° C. and atmospheric pressure. Stripping was performed under conditions that formed a capped MQ resin solution with xylene (which was present from MQ-1). A sample of the resulting capped MQ resin solution was then analyzed for vinyl content via FTIR to determine the extent of reaction. Vinyl concentration was determined to be 1.02% based on the capped MQ resin solids in the solution.

Example 1 illustrates that by adding the polar organic solvent, i.e. 2-propanol, as a process aid reaction conversion is improved under the same capping conditions used in Comparative Example 1.

In example 2, 1.0 g 2-propanol was added to 496 g of MQ-2 in the flask with stirring, followed closely by adding 50 g of $Me_2ViSiCl$. The resulting mixture was then reacted for 4 hours at 75° C. Unreacted $Me_2ViSiCl$ and volatile by-products were then stripped from the reaction mixture by heating at 135° C. and atmospheric pressure. A sample of the resulting capped MQ resin solution was then analyzed for vinyl content via FTIR to determine the extent of reaction. Vinyl concentration was determined to be 1.85% based on the capped MQ resin solids in the solution.

In Comparative Example 2, 50 g $Me_2ViSiCl$ was added to 497 g of MQ-2 in the flask with stirring. The resulting mixture was reacted for 4 hours at 75° C. Unreacted $Me_2ViSiCl$ and volatile by-products were then stripped from the reaction mixture by heating at 136° C. and atmospheric pressure. A sample of the resulting capped MQ resin solution was then analyzed for vinyl content via FTIR to determine the extent of reaction. Vinyl concentration was determined to be 1.70% based on the capped MQ resin solids in the solution.

Example 2 illustrates once again that adding 2-propanol as a process aid improves reaction conversion under the same capping conditions used in Comparative Example 2.

In example 3, an acid catalyst was added. In this example, 2.5 g of 0.1 N HCl in 2-propanol was added to 500 g of stirring MQ-3, followed closely by addition of 49.5 g of $Me_2ViSiCl$ to the flask. The resulting mixture was then reacted for 4 hours at 75° C. Unreacted $Me_2ViSiCl$ and volatile by-products were then stripped from the reaction mixture at atmospheric pressure and 135° C. A sample of the resulting capped MQ resin solution was then analyzed for vinyl content via FTIR to determine the extent of reaction. Vinyl concentration was determined to be 1.78% based on the capped MQ resin solids in the solution.

In example 4, 2.5 g of 0.1 N HCl in 2-propanol was added to 500 g of stirring MQ-4, followed closely by the addition of 49.5 g of $Me_2ViSiCl$ to the flask. The resulting mixture was then reacted for 4 hours at 75° C. Following completion of the reaction step, unreacted $Me_2ViSiCl$ and volatile by-products were then stripped from the reaction mixture at atmospheric pressure and 135° C. Capped MQ resin solution was recovered by adding 30 g deionized water and 36 g xylene to wash the reaction mixture, followed by a stripping step to trap water and remove residual HCl. A sample of the resulting capped MQ resin solution was then analyzed for vinyl content (via FTIR) to determine the extent of reaction. Vinyl concentration was determined to be 1.76% based on the capped MQ resin solids in the solution.

In example 5, 2.5 g of 2-propanol was added to 500 g of stirring MQ-5, followed closely by the addition of 49.5 g of $Me_2ViSiCl$ to the flask. The resulting mixture was then reacted for 4 hours at 75° C. Following completion of the reaction step, the reaction mixture was heated to 130° C. and allowed to reflux for an additional 2 hours. The reaction mixture was then stripped at 135° C. to remove any unreacted $Me_2ViSiCl$ and volatile by-products. A sample of the resulting capped MQ resin was then analyzed for vinyl content (via FTIR) to determine the extent of reaction. Vinyl concentration was determined to be 1.92% per g of capped MQ resin solids.

In examples 6-12, resin MQ-6 was combined with $Me_2ViSiCl$ and reacted in the absence or presence of an alcoholic compound for 4 hours at 75° C. Following completion of the reaction step, the reaction mixture was heated to 130° C. and allowed to reflux for an additional 2 hours. The reaction mixture was then stripped at 135° C. to remove any unreacted $Me_2ViSiCl$ and volatile by-products. A sample of the resulting capped MQ resin was then analyzed for vinyl content (via FTIR) to determine the extent of reaction. Results are summarized in Table 1 below.

TABLE 1

| Exp. No. | Alcohol additive | Alcohol Wt. (gm) | Resin Wt. (gm) | ViMe$_2$SiCl Wt. (gm) | [Vi] wt % |
|---|---|---|---|---|---|
| 6 | none | 0.0 | 500 | 50.0 | 0.86 |
| 7 | t-butanol | 3.07 | 502 | 49.5 | 0.99 |
| 8 | s-butanol | 3.12 | 504 | 50.1 | 1.49 |
| 9 | n-butanol | 3.08 | 500 | 49.6 | 1.77 |
| 10 | n-propanol | 2.52 | 501 | 49.5 | 1.91 |
| 11 | n-hexanol | 4.29 | 500 | 49.6 | 1.80 |
| 12 | i-propanol | 2.57 | 500 | 49.6 | 1.65 |

In examples 13-16, resin MQ-7 was combined with Me$_2$ViSiCl and reacted in the absence or presence of a polar additive for 4 hours at 75° C. Following completion of the reaction step, the reaction mixture was heated to 130° C. and allowed to reflux for an additional 2 hours. The reaction mixture was then stripped at 135° C. to remove any unreacted Me$_2$ViSiCl and volatile by-products. A sample of the resulting capped MQ resin was then analyzed for vinyl content (via FTIR) to determine the extent of reaction. Results are summarized in Table 2 below.

TABLE 2

| Exp. No. | Polar compound | Wt. Polar compound (gm) | Resin Wt. (gm) | ViMe$_2$SiCl Wt. (gm) | [Vi] wt % |
|---|---|---|---|---|---|
| 13 | none | 0.0 | 501 | 49.5 | 0.87 |
| 14 | Gl. HOAc | 2.51 | 501 | 49.6 | 1.23 |
| 15 | MEK | 6.22 | 500 | 49.5 | 1.07 |
| 16 | DMF | 6.18 | 501 | 49.5 | 1.81 |

It is thought that capping MQ resins can be more difficult than capping other types of polyorganosiloxane resins (such as DT, MDT, DTQ, or MQ/T resins) due to the increased steric hindrance present in MQ resins as compared to such other types of polyorganosiloxane resins. As illustrated by the examples, the polar organic compound indeed acts as a process aid to facilitate the capping reaction that produces the capped MQ-type silicone resin. Specifically, use of a polar organic compound improves reaction conversion.

The subject matter of all combinations of independent and dependent claims, both singly and multiply dependent, is expressly contemplated but is not described in detail for the sake of brevity. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

All ratios, percentages, and other amounts are by weight, unless otherwise indicated. The articles 'a', 'an', and 'the' each refer to one or more, unless otherwise indicated by the context of the specification. Abbreviations used herein are defined in Table 3, below.

TABLE 3

| Abbreviations | |
|---|---|
| Abbrev. | Word |
| % | Percent |
| Bu | "Bu" means butyl and includes branched and linear structures such as iso-butyl and, n-butyl. |
| ° C. | degrees Celsius |
| Et | Ethyl |
| FTIR | Fourier Transform Infra Red |
| g | grams |
| GPC | gel permeation chromatography |
| h | hours |
| Me | Methyl |
| Ph | Phenyl |
| Pr | "Pr" means propyl and includes branched and linear structures such as iso-propyl and, n-propyl. |
| Vi | Vinyl |

"Alkyl" means an acyclic, branched or unbranched, saturated monovalent hydrocarbon group. Examples of alkyl groups include Me, Et, Pr, 1-methylethyl, Bu, 1-methylpropyl, 2-methylpropyl, 1,1-dimethylethyl, 1-methylbutyl, 1-ethylpropyl, pentyl, 2-methylbutyl, 3-methylbutyl, 1,2-dimethylpropyl, 2,2-dimethylpropyl, hexyl, heptyl, 2-ethylhexyl, octyl, nonyl, and decyl; and as well as other branched saturated monovalent hydrocarbon groups with 6 or more carbon atoms. Alkyl groups have at least one carbon atom. Alternatively, alkyl groups may have 1 to 12 carbon atoms, alternatively 1 to 10 carbon atoms, alternatively 1 to 6 carbon atoms, alternatively 1 to 4 carbon atoms, alternatively 1 to 2 carbon atoms, and alternatively 1 carbon atom.

"Aralkyl" and "alkaryl" each refer to an alkyl group having a pendant and/or terminal aryl group or an aryl group having a pendant alkyl group. Exemplary aralkyl groups include benzyl, tolyl, xylyl, phenylethyl, phenyl propyl, and phenyl butyl. Aralkyl groups have at least 6 carbon atoms. Monocyclic aralkyl groups may have 6 to 12 carbon atoms, alternatively 6 to 9 carbon atoms, and alternatively 6 to 7 carbon atoms. Polycyclic aralkyl groups may have 7 to 17 carbon atoms, alternatively 7 to 14 carbon atoms, and alternatively 9 to 10 carbon atoms.

"Alkenyl" means an acyclic, branched, or unbranched unsaturated monovalent hydrocarbon group, where the monovalent hydrocarbon group has a double bond. Alkenyl groups include Vi, allyl, propenyl, and hexenyl. Alkenyl groups have at least 2 carbon atoms. Alternatively, alkenyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Alkynyl" means an acyclic, branched, or unbranched unsaturated monovalent hydrocarbon group, where the monovalent hydrocarbon group has a triple bond. Alkynyl groups include ethynyl and propynyl. Alkynyl groups have at least 2 carbon atoms. Alternatively, alkynyl groups may have 2 to 12 carbon atoms, alternatively 2 to 10 carbon atoms, alternatively 2 to 6 carbon atoms, alternatively 2 to 4 carbon atoms, and alternatively 2 carbon atoms.

"Aryl" means a cyclic, fully unsaturated, hydrocarbon group. Aryl is exemplified by, but not limited to, Ph and naphthyl. Aryl groups have at least 5 carbon atoms. Monocyclic aryl groups may have 5 to 9 carbon atoms, alternatively 6 to 7 carbon atoms, and alternatively 6 carbon atoms. Polycyclic aryl groups may have 10 to 17 carbon atoms, alternatively 10 to 14 carbon atoms, and alternatively 12 to 14 carbon atoms.

"Carbocycle" and "carbocyclic" refer to a hydrocarbon ring. Carbocycles may be monocyclic or alternatively may be fused, bridged, or spiro polycyclic rings. Carbocycles have at least 3 carbon atoms. Monocyclic carbocycles may have 3 to 9 carbon atoms, alternatively 4 to 7 carbon atoms, and alternatively 5 to 6 carbon atoms. Polycyclic carbocycles may have 7 to 17 carbon atoms, alternatively 7 to 14 carbon atoms, and alternatively 9 to 10 carbon atoms. Carbocycles may be saturated or partially unsaturated.

"Cycloalkyl" refers to a saturated hydrocarbon group including a carbocycle. Cycloalkyl groups are exemplified by cyclobutyl, cyclopentyl, cyclohexyl, and methylcyclohexyl. Cycloalkyl groups have at least 3 carbon atoms. Monocyclic cycloalkyl groups may have 3 to 9 carbon atoms, alternatively 4 to 7 carbon atoms, and alternatively 5 to 6 carbon atoms. Polycyclic cycloalkyl groups may have 7 to 17 carbon atoms, alternatively 7 to 14 carbon atoms, and alternatively 9 to 10 carbon atoms.

With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination with any other member or members of the group, and each member provides adequate support for specific embodiments within the scope of the appended claims. For example, disclosure of the Markush group: alkyl, aryl, and carbocyclic includes the member alkyl individually; the subgroup alkyl and aryl; and any other individual member and subgroup subsumed therein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. The enumerated ranges and subranges sufficiently describe and enable various embodiments of the present disclosure, and such ranges and subranges may be further delineated into relevant halves, thirds, quarters, fifths, and so on. As just one example, a range "of 200 to 1400" may be further delineated into a lower third, i.e., from 200 to 600, a middle third, i.e., from 600 to 1000, and an upper third, i.e., from 1000 to 1400, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 0.1%" inherently includes a subrange from 0.1% to 35%, a subrange from 10% to 25%, a subrange from 23% to 30%, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range of "1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A method for producing capped MQ resins, the method comprising the steps of combining an MQ-based silicone resin having the formula: $R^1{}_n(RO)_b SiO_{((4-n-b)/2)}$, where each $R^1$ is monovalent and independently selected from hydrogen, hydrocarbyl, oximo, epoxide, carboxyl, ether, polyether, amide, and alkyl amino groups, which R1 moieties may be the same or different, with the proviso that at least sixty mole percent of the $R^1$ groups are hydrocarbyl, subscript n is 1.1 to 1.6, subscript b has a value such that group (RO) is 1 weight % to 20 weight % of the MQ-based silicone resin, and each R is hydrogen or an alkyl group of 1 to 4 carbon atoms; an alkenyl functional halosilane capping agent having the general formula $R^5 R^4{}_2 SiR^3$, where each $R^3$ is a halogen atom, where each $R^4$ is H, a siloxy group or a monovalent hydrocarbyl group, and where each $R^5$ is an alkenyl group; and a polar organic compound.

2. The method of claim 1, further including a condensation catalyst.

3. The method of claim 2, wherein the condensation catalyst is added in an amount of 10 ppm to 10,000 ppm based on combined weights of the ingredients.

4. The method of claim 1, further including a solvent.

5. The method of claim 4, wherein the solvent is added in an amount sufficient to render the mixture a liquid under ambient conditions.

6. The method of claim 1, wherein the halosilane capping agent is present in an amount sufficient to provide 0.05 to 5 moles of capping agent per mole of (RO) groups in the MQ-based silicone resin and the polar organic compound is present in an amount sufficient to provide 0.005 to 5 moles of polar organic compound per mole of (RO) groups in the MQ-based silicone resin.

7. The method of claim 1, wherein each R is hydrogen, each $R^1$ is selected from methyl, vinyl, hydrogen, and phenyl, n is 1.1 to 1.5, and b is such that the group (RO) is 1 weight % to 4 weight % of the MQ-based silicone resin.

8. The method of claim 1, wherein the alkenyl-functional halosilane capping agent is selected from the group consisting of dimethylhexenylchlorosilane, dimethylvinylchlorosilane, methylphenylvinylchlorosilane, dimethylvinylbromosilane, methylphenylvinylbromosilane, and combinations thereof.

9. The method of claim 1, wherein the polar organic compound is selected from an alcohol, an ether, a ketone, an ester, and a combination thereof.

10. The method of claim 9, wherein the polar organic compound is an alcohol and the alcohol is methyl alcohol, ethyl alcohol, iso-propyl alcohol, n-propyl alcohol, tert-butyl alcohol, sec-butyl alcohol, iso-butyl alcohol, n-butyl alcohol, n-hexanol or a combination thereof.

11. The method of claim 1, wherein the acid catalyst is present and is selected from the group consisting of HCl, HBr, trifluoroacetic acid trifluoromethanesulfonic acid, and a strong acid ion exchange resin.

12. The method of claim 1, further comprising heating the mixture and/or recovering the capped MQ-based silicone resin.

13. A capped MQ resin produced in accordance with the method of claim 1.

* * * * *